(12) United States Patent
Pazdirek

(10) Patent No.: US 6,572,127 B2
(45) Date of Patent: Jun. 3, 2003

(54) LINK ASSEMBLY FOR A VEHICLE SUSPENSION SYSTEM

(75) Inventor: Jiri Pazdirek, Schaumburg, IL (US)

(73) Assignee: MacLean-Fogg Company, Mundeline, IL (US)

( * ) Notice: Subject to any disclaimer, the term of this patent is extended or adjusted under 35 U.S.C. 154(b) by 0 days.

(21) Appl. No.: 09/860,880

(22) Filed: May 18, 2001

(65) Prior Publication Data

US 2002/0171220 A1 Nov. 21, 2002

(51) Int. Cl.$^7$ .............. B60G 3/02; B62D 7/06
(52) U.S. Cl. ............ 280/124.152; 280/93.502; 403/48; 411/383; 411/389
(58) Field of Search ............ 280/93.51, 93.502, 280/124.106, 124.107, 124.152; 403/48, 47, 43; 411/383, 384, 389

(56) References Cited

U.S. PATENT DOCUMENTS

| | | |
|---|---|---|
| 1,871,918 A | 8/1932 | Rossman |
| 1,952,115 A | 3/1934 | Borst, Jr. |
| 1,971,676 A | 8/1934 | Borst, Jr. |
| 2,060,593 A * | 11/1936 | Schaurte et al. |
| 2,308,967 A | 1/1943 | Kuss |
| 2,467,548 A | 4/1949 | Bradley |
| 2,661,969 A * | 12/1953 | Thiry |
| 2,740,650 A | 4/1956 | Hutton |
| 2,819,105 A | 1/1958 | Behnke |
| 2,859,047 A | 11/1958 | Easton |
| 2,937,040 A | 5/1960 | Hutton |
| 3,083,796 A | 4/1963 | Bell, Jr. |
| 3,199,186 A | 8/1965 | Simpson |
| 3,492,906 A * | 2/1970 | Hauser |
| 4,066,278 A | 1/1978 | Takagi |
| 4,113,278 A | 9/1978 | Rissberger |
| 4,552,379 A | 11/1985 | Foster |
| 4,621,831 A | 11/1986 | Takadera et al. |
| 4,944,523 A * | 7/1990 | Hardy et al. |
| 5,449,193 A | 9/1995 | Rivard et al. |
| 5,551,722 A * | 9/1996 | Schwartz et al. |
| 5,704,631 A | 1/1998 | Sparks et al. |
| 5,807,010 A | 9/1998 | Parker et al. |
| 6,007,079 A | 12/1999 | Kincaid et al. |
| 6,225,566 B1 | 5/2001 | Dienst |
| 6,357,953 B1 * | 3/2002 | Ballantyne ............ 403/43 |
| 6,402,171 B1 * | 6/2002 | Nickerson et al. .... 280/124.106 |

* cited by examiner

Primary Examiner—Paul N. Dickson
Assistant Examiner—Joselynn Y. Sliteris
(74) Attorney, Agent, or Firm—Richard G. Lione; Brinks Hofer Gilson & Lione

(57) ABSTRACT

A suspension link assembly for a vehicle suspension system. A preferred form comprises only three different kinds of components. The components are a stud shaft, a sleeve nut and a grommet. In an alternative form a barrel-shaped, molded plastic spacer is added. The link assembly lends itself to partial preassembly off the vehicle assembly line and delivery to the assembler as a kit.

15 Claims, 3 Drawing Sheets

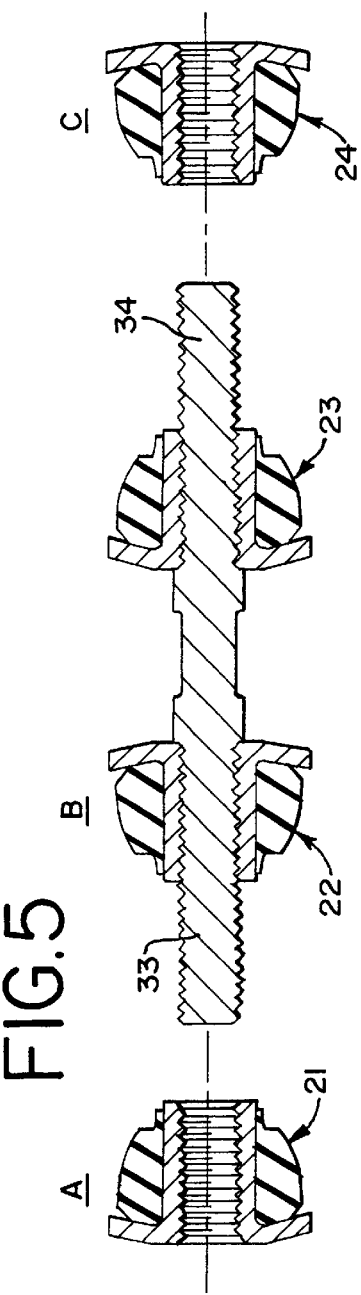
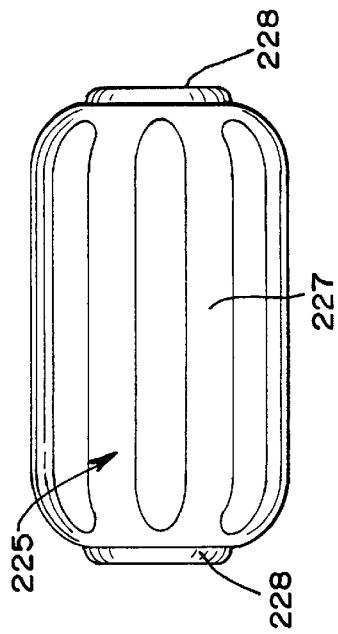
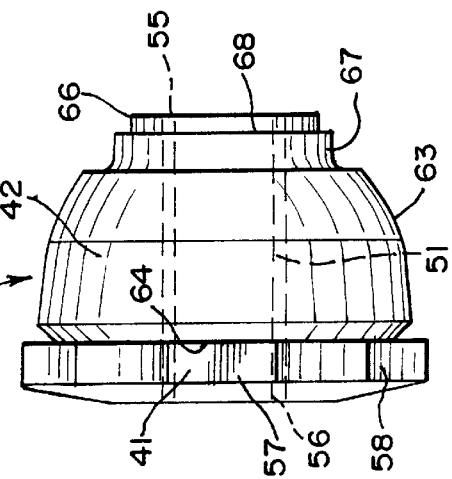

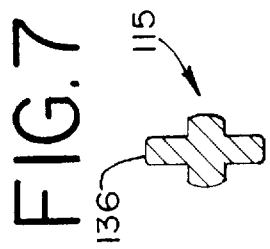
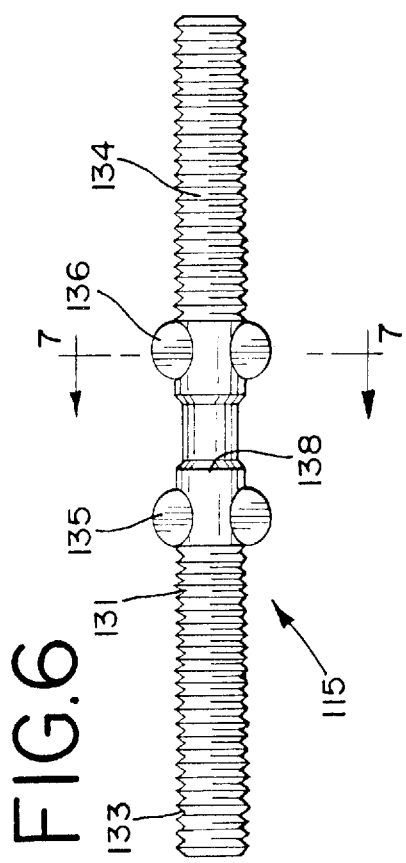
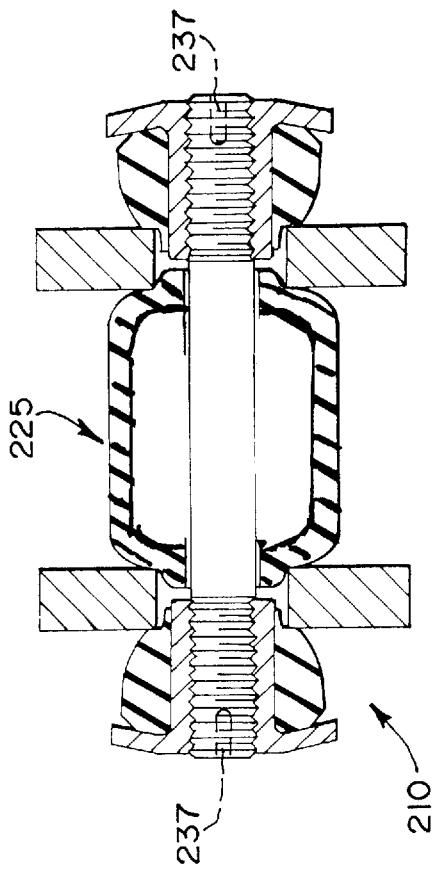

LINK ASSEMBLY FOR A VEHICLE SUSPENSION SYSTEM

FIELD OF THE INVENTION

This invention relates generally to vehicle suspension systems. It relates particularly to a link assembly for a suspension system.

BACKGROUND OF THE INVENTION

Motor vehicles have long been provided with independent suspension systems to absorb road shocks and other vibrations and provide a smoother, more comfortable ride. In suspension systems of this type, a stabilizer bar is normally incorporated to increase roll resistance and improve the steering to stability of the vehicle. Typically, the stabilizer bar is a torsion rod which extends transversely of the vehicle. It has an integral crank arm provided at each end. The rod is rotatably supported from the vehicle chassis adjacent each crank arm, and each crank arm is coupled to a suspension arm by a connector link assembly.

When the vehicle is subject to forces which cause it to roll, the crank arms pivot relatively about the longitudinal axis of the rod, against the torsional resistance of the rod. Torsion forces which are exerted through the crank arms urge the suspension arms of the vehicle back toward their normal position. This type of stabilizer bar acts in a manner such that when paired left and right wheels differ in level from each other due to a cornering maneuver, for example, the vehicle body will be prevented from excessive rolling or leaning to either side by torsional resistance of the stabilizer bar.

The link assembly, which connects the crank arms of the torsion rod to the vehicle body and to the suspension arms, is generally one of two types. It is either a bolt-type assembly or a stud-type assembly. In a bolt-type assembly a suitably dimensioned bolt and nut are used to connect the stabilizer bar to the vehicle suspension arm. Pliable bushings or grommets assembled on the bolt engage the exterior surfaces of the stabilizer bar arms and the vehicle suspension arms. A pair of similarly shaped grommets engage the interior surfaces of the respective vehicle elements and are in engagement with a pair of inner washers which are maintained at a predetermined spaced distance by a cylindrical sleeve mounted on the shaft of the bolt.

In a stud-type assembly, the stud shaft has both ends threaded. Accordingly, retainer nuts are threaded onto both ends of the stud shaft. Once again, pliable bushings or grommets assembled on the stud shaft engage the exterior surfaces of the stabilizer bar arms and the vehicle suspension arms. A pair of similarly shaped grommets engage the interior surfaces of the respective vehicle elements and are in engagement with a pair of inner washers which are maintained at a predetermined spaced distance by a cylindrical sleeve mounted on the shaft of the stud.

Regardless of whether a bolt or stud-type link assembly is employed, prior art constructions have generally suffered from complexity and cost shortcomings. Such assemblies normally comprises at least four, and sometimes as many as six, different components. Furthermore, assembly is normally done on the vehicle assembly line from these many components.

SUMMARY OF THE INVENTION

An object of the present invention is to provide an improved suspension link assembly for a vehicle suspension system.

Another object is to provide an improved stud-type suspension link assembly which is simpler in construction and less expensive than existing link assemblies.

Still another object is to provide a stud-type suspension link assembly which is easier to fabricate and install than existing link assemblies.

Yet another object is to provide a stud-type suspension link assembly which is composed of only three different kinds of components.

A further object is to provide a stud-type suspension link assembly which can be delivered to the vehicle manufacturer's assembly line in preassembled sub-assemblies.

The foregoing and other objects are realized in accord with the present invention by providing a suspension link assembly which, in its preferred form, comprises only three different kinds of components. The three components are a stud shaft having identical threaded sections at each end, a sleeve nut and a grommet. Four of the grommets, four of the sleeve nuts and a stud shaft make up the assembly.

Each assembly thus comprises nine components; four sleeve nuts, four grommets and a stud shaft, but only three different kinds of components. Furthermore, the vehicle manufacturer can purchase and deliver the assemblies to the vehicle assembly line as a kit comprising only two different sub-assemblies. In one, the stud shaft is preassembled with two sleeve nut and grommet sub-assemblies. The other comprises a sleeve and grommet sub-assembly, of which two are called for.

BRIEF DESCRIPTION OF THE DRAWINGS

The invention, including its construction and method of operation, is illustrated more or less diagrammatically in the drawings, which:

FIG. 4 is an enlarged side elevational view of a sleeve nut and grommet sub-assembly for the link assembly of the invention;

FIG. 5 is an exploded view of the three sub-assemblies which make up a suspension link assembly embodying features of the present invention;

FIG. 6 is a side elevational view of a modified stud shaft;

FIG. 7 is a sectional view taken along line 7—7 of FIG. 6;

FIG. 8 is a side elevational view of a spacer for a second embodiment of link assembly comprising features of the invention; and FIG. 9 is a sectional view of the second embodiment of link assembly.

DESCRIPTION OF THE PREFERRED EMBODIMENT

Figure 1:
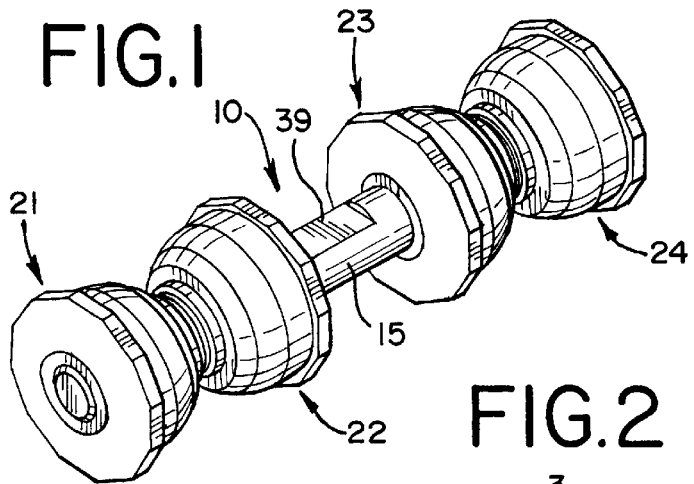
FIG. 1 is a perspective view of a link assembly comprising features of the present invention.
Figure 2:
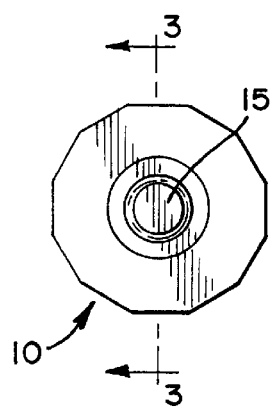
FIG. 2 is an end view of the link assembly of FIG. 1.
Figure 3:
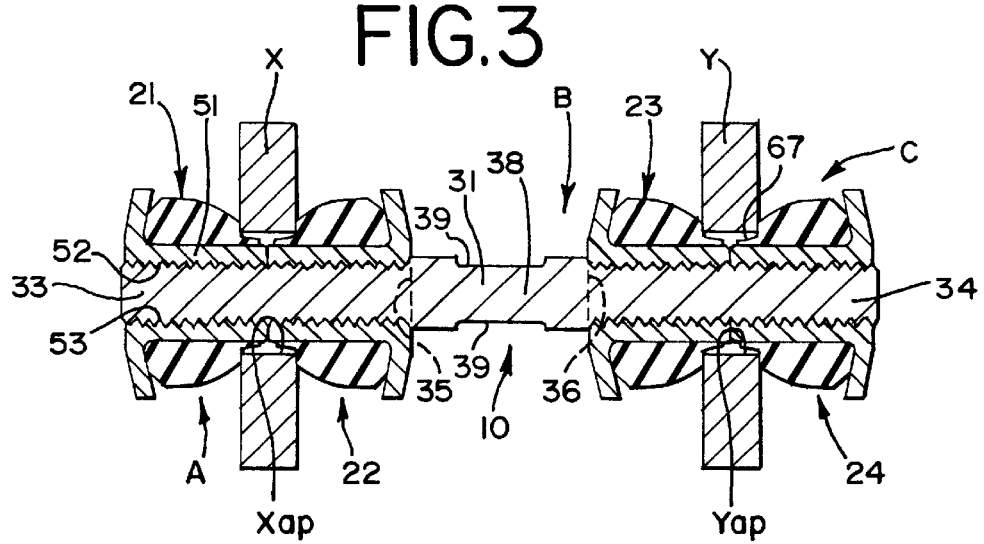
FIG. 3 is a sectional view along line 3—3 of FIG. 2, with portions of a vehicle stabilizer bar crank arm and a suspension system arm shown connected by the link assembly of FIGS. 1 and 2.

Referring now to the drawings, a suspension link assembly embodying features of the invention is seen generally at 10 in FIGS. 1–3. The link assembly 10 includes a stud shaft 15 on which four identical sleeve nut and grommet sub-assemblies 21–24 are mounted.

The stud shaft 15 includes a shaft body 31 of predetermined length. The shaft body 31 has threaded sections 33 and 34 at each end. The threaded end sections 33 and 34 terminate in stops formed by chamfers 35 and 36, respectively. The chamfers 35 and 36 are at opposite ends of a center spacer section 38. The section 38 has flats formed on opposite sides, as at 39, for reasons hereinafter explained. The stud shaft 15 is fabricated of steel which is plated for corrosion resistance.

Since the nut and grommet sub-assemblies 21–24 are identical, only the sub-assembly 21 is described in detail. Corresponding reference numerals may be applied to corresponding components in each of the other sub-assemblies 22–24.

Referring to FIG. 4 in addition to FIGS. 1–3, the sub-assembly 21 comprises a tubular sleeve nut 41 and a grommet 42. The nut 41 is formed from heat treated carbon steel. The grommet 42 is molded of resilient material such as natural rubber or polyurethane or the like.

The nut 41 comprises a tubular segment 51 with a bore 52 which is internally threaded at 53. Both ends of the threaded bore 52 are formed with a 45° chamfer, as at 55 and 56. A shallow, cup-shaped head 57 is formed at one end of the tubular segment 51. The periphery 58 of the head is polygon-shaped, for reasons hereinafter explained.

The molded elastomer grommet 42 has a cylindrical bore 61 through it. The bore 61 has an inside diameter (ID) which is slightly smaller than the outside diameter (OD) of the tubular segment 51 in the nut 41.

The grommet 42 also has a generally "bee-hive" shape external surface 63 on its inner end. Its outer end has a slightly spherical surface 64 which is complementary in shape to the disc-shaped head 57 in the nut 41.

The sleeve nut and grommet sub-assembly 21 is assembled by press fitting a grommet 42 over a tubular segment 51 of a nut 41 until the surface 64 of the grommet seats against the cup-shaped head 57 of the nut. Since the ID of the bore 61 is slightly smaller than the OD of the nut's tubular segment 51, the grommet resiliently grips the nut 41. When assembled, the free end 66 of the tubular segment 51 on the nut 41 protrudes slightly beyond a cylindrical lip 67 on which the end surface 68 of the grommet 42 is formed.

Referring now also to FIG. 5, the three different components of the assembly 10, the stud shaft 15, sleeve nuts 41 and grommets 42 are optionally preassembled by the vehicle manufacturer into three component assemblies A, B and C before being sent as a kit to the assembly line. In a pre-assembly operation, four sleeve nut and grommet sub-assemblies 21–24 are assembled in the afore-described manner. Two of the sleeve nut and grommet sub-assemblies, 22 and 23 in the drawings, are then threaded onto opposite end sections 33 and 34, respectively, of the stud shaft body 31. This creates the component assembly B. Two sleeve nut and grommet sub-assemblies 21 and 24, which are identical to each other, comprise the component assemblies A and C.

Referring again to FIG. 3, the three component assemblies A, B and C are mated with the suspension arm X and a torsion bar arm Y in the manner illustrated. The opposite ends of the component assembly B are inserted through suitably dimensioned apertures Xap and Yap in the respective arms X and Y. The apertures Xap and Yap have diameters large enough so that a cylindrical lip 67 of a corresponding grommet 42 extends into each aperture. The sleeve nut and grommet sub-assembly 21 is then threaded onto one end of the shaft body 31 and the sub-assembly 24 is threaded onto the other end. Corresponding grommets 42 engage respective arms X and Y in the manner just described.

This initial assembly is easily accomplished by hand. Only three items (assemblies A, B and C) need be handled by the assembler so assembly time is minimized. The assembler then grips the shaft body 31 on the flats 34 with a wrench and tightens the sleeve nuts 41 (the periphery 58 of the head 57 is polygon shaped) with another wrench.

When fully assembled, the ends 68 of the tubular segments 51 abut each. The faces 63 of opposed bushings 42, which engage respective arms X and Y, are then spaced from each other a distance which just accommodates the thickness of corresponding arms.

Referring now to FIGS. 6 and 7 of modified form of stud shaft for a link assembly 10 is shown at 115. The stud shaft 115 comprises a shaft body 131 having threaded end sections 133 and 134, and a center spacer section 138.

One end of the spacer section 138 has four protruding upsets 135 formed therein. The other end has four protruding upsets 136 formed therein. Flats 139 are formed on opposite sides of the spacer section 138.

The stud shaft 115 is employed in the manner of link assembly 10. The upsets 135 and 136 serve as stops for two inside sleeve nut and grommet sub-assemblies identical to sub-assemblies 22 and 23 previously described. In all other respects the link assembly would be identical to assembly 10.

Referring now to FIGS. 8 and 9, a link assembly comprising a second embodiment of the invention is seen generally at 210. The link assembly 210 is identical to the assembly 10 previously described except for two features. First, the sleeve nut and grommet assemblies 22 and 23 are replaced by a unitary spacer 225. Second the center spacer section 238 of the stud shaft body 231 does not have opposed flats formed on it but, instead, has allen-wrench sockets 237 formed axially into its opposite ends.

The spacer 225 is a hollow, barrel shaped body molded of polyurethane. It includes a plurality of longitudinally extending ribs 227 which serve to enhance its axial rigidity and strength. It has annular collars 228 formed at each end. The diameter of each collar 228 is such that it seats in the corresponding suspension arm aperture.

While preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein.

What is claimed is:

1. A vehicle torque arm and suspension arm assembly kit consisting of three component sub-assemblies which, when used to connect a torque arm and a suspension arm in a vehicle suspension system, form a suspension link assembly, comprising:

a) first and second component sub-assemblies, each of which consists of a sleeve nut and a grommet; and b) a third component sub-assembly which consists of a shaft having a threaded section at each end and a third and fourth sleeve nut and grommet sub-assemblies threaded onto opposite end sections;

c) each of said sleeve nut and grommet sub-assemblies being substantially identical to each of the other sleeve nut and grommet sub-assemblies.

2. In a vehicle suspension system including a suspension arm and a stabilizer torsion bar having a torsion arm, each of said arms having an aperture of predetermined diameter therein, the improvement in a link assembly for connecting said arms comprising:

a) a stud shaft having a threaded section at each end, said stud shaft extending through each of said apertures;

b) a pair of sleeve nuts threaded onto each of said threaded sections, each of said sleeve nuts including a tubular segment and a radially extending head at one end of said tubular segment, the opposite ends of each of said tubular segments in each pair extending into abutting relationship with the other sleeve nut and;

c) a grommet mounted on each of said tubular segments, each of said grommets being shorter than a corresponding tubular segment whereby opposed faces on grommets associated with each pair of sleeve nuts are spaced from each other a predetermined distance;

d) one of said arms extending between the opposed faces of one pair of opposed grommets and the other of said arms extending between the opposed faces of the other pair of opposed grommets, the corresponding tubular segments extending through corresponding apertures.

3. The improvement in a link assembly of claim 2 further characterized in that:

a) each of said grommets is seated on a corresponding tubular segment in interfering relationship.

4. The improvement in a link assembly of claim 3 further characterized in that:

a) each of said radially extending heads has a shallow cup-shaped configuration;

b) each of said grommets having an outer face which is generally complementary in shape to a corresponding head and seats snugly against said head.

5. A link assembly for connecting suspension components in a vehicle suspension system comprising:

a) a shaft having a threaded section at one end for connection to a suspension component;

b) a pair of substantially identical sleeve nut and grommet sub-assemblies threaded onto said threaded section of said shaft;

c) each of said pair of sleeve nut and grommet sub-assemblies including a sleeve nut and a grommet with the sleeve nut having a sleeve extending through the grommet and a head engaging one end of the grommet;

d) each of said sleeves having a free end opposite a corresponding head, the free ends of said sleeves extending into abutting relationship with each other;

(e) each of said grommets extending along a corresponding sleeve to an opposite end of the grommet which is spaced from the free end of a corresponding sleeve and is adapted to engage the suspension component.

6. A link assembly for connecting an arm of a stabilizer torsion bar to a suspension arm in a vehicle suspension system, comprising:

a) a stud shaft having a threaded section at each end;

b) first and second sleeve nuts threaded onto opposite ones of said threaded end sections;

c) a grommet seated on each said sleeve nuts to form first and second sleeve nut and grommet sub-assemblies; and d) a spacer on said shaft between said first and second sleeve nut and grommet sub-assemblies;

e) each of said sleeve nuts being substantially identical to the other sleeve nut and each of said grommets being substantially identical to the other grommet;

f) each of said sleeve nuts including tubular segment and a radially extending head at one end of said tubular segment, the opposite end of each tubular segment protruding from a corresponding grommet.

7. The link assembly of claim 6 further characterized in that:

a) said spacer includes third and fourth sleeve nut and grommet sub-assemblies, each of which is substantially identical to each other and to each of said first and second sleeve nut and grommet sub-assemblies;

b) the opposite end of each of said tubular segments in said first and third sleeve nut and grommet sub-assemblies extending into abutting relationship with each other;

c) the grommets in said first and third sleeve nut and grommet sub-assemblies being spaced from each other.

8. The link assembly of claim 7 further characterized in that:

a) said spacer further includes abutments formed on said shaft between said threaded end sections.

9. The link assembly of claim 8 further characterized in that:

(a) said abutments comprise chamfers formed at an inner end of each threaded section.

10. The link assembly of claim 8 further characterized in that:

a) said abutments comprise a plurality of upsets formed in a center a section of said shaft adjacent each of said threaded end sections.

11. The link assembly of claim 6 further characterized in that:

a) said spacer comprises a hollow body molded of plastic.

12. The link assembly of claim 11 further characterized in that:

a) said body is barrel shaped and has a plurality of longitudinally extending ribs formed in the periphery.

13. The link assembly of claim 7 further characterized in that:

a) each of said sleeve nuts includes a tubular segment and a cup-shaped head; and b) each of said grommets has a curved surface at one end complementary in shape to said cup-shaped head and an opposite face for engaging one of said arms.

14. The link assembly of claim 7 further characterized in that:

a) each of said sleeve nuts includes a tubular segment of predetermined outside diameter and an enlarged end; and b) each of said grommets has a bore therethrough with an inside diameter slightly smaller than said predetermined outside diameter.

15. In a vehicle suspension system including a suspension arm and a stabilizer torsion bar having a torsion arm, each of said arms having an aperture of predetermined diameter therein, the improvement in a link assembly for connecting said arms comprising:

a) a stud shaft having a threaded section at each end, said stud shaft extending through each of said apertures;

b) a pair of sleeve nuts threaded onto each of said threaded sections, each of said sleeve nuts including a tubular segment and a radially extending head at one end of said tubular segment, the opposite ends of each of said tubular segments in each pair extending into abutting relationship with the other sleeve nut; and c) a grommet mounted on each of said tubular segments, each of said grommets having an engaging face and being shorter than a corresponding tubular segment at said face whereby opposed arm engaging faces on grommets associated with each pair of sleeve nuts are spaced from each other a predetermined distance;

d) one of said arms extending between the opposed faces of one pair of opposed grommets and the other of said arms extending between the opposed faces of the other pair of opposed grommets, the corresponding tubular segments extending through corresponding apertures;

e) said opposed faces engaging corresponding arms on the sides of said arms substantially outside of corresponding apertures.

* * * * *